US010980251B2

(12) United States Patent
Pimentel et al.

(10) Patent No.: US 10,980,251 B2
(45) Date of Patent: Apr. 20, 2021

(54) COLD WEATHER FORMULATION FOR CONDITIONING ANIMAL FEED

(75) Inventors: Julio Pimentel, Buford, GA (US); Kurt Richardson, Maysville, GA (US); Don Wilson, Milton, FL (US)

(73) Assignee: Anitox Corporation, Lawrenceville, GA (US)

( * ) Notice: Subject to any disclaimer, the term of this patent is extended or adjusted under 35 U.S.C. 154(b) by 1439 days.

(21) Appl. No.: 14/126,699

(22) PCT Filed: Jun. 17, 2012

(86) PCT No.: PCT/US2012/042848
§ 371 (c)(1),
(2), (4) Date: Dec. 16, 2013

(87) PCT Pub. No.: WO2013/003080
PCT Pub. Date: Jan. 3, 2013

(65) Prior Publication Data
US 2014/0178562 A1    Jun. 26, 2014

Related U.S. Application Data

(60) Provisional application No. 61/501,225, filed on Jun. 26, 2011.

(51) Int. Cl.
| A23K 20/105 | (2016.01) |
| A23K 40/20 | (2016.01) |
| A23K 20/10 | (2016.01) |
| A23K 50/75 | (2016.01) |
| A23K 20/158 | (2016.01) |

(52) U.S. Cl.
CPC ........... *A23K 20/105* (2016.05); *A23K 20/10* (2016.05); *A23K 20/158* (2016.05); *A23K 40/20* (2016.05); *A23K 50/75* (2016.05)

(58) Field of Classification Search
CPC .... A23K 1/1646; A23K 50/75; A23K 20/158; A23K 20/10
See application file for complete search history.

(56) References Cited

U.S. PATENT DOCUMENTS

| 3,895,116 | A | 7/1975 | Herting et al. |
| 4,223,045 | A | 9/1980 | Fink |
| 4,701,331 | A | 10/1987 | Grabitz |
| 5,505,976 | A | 4/1996 | Bland et al. |
| 5,547,987 | A | 8/1996 | Bland et al. |
| 5,591,467 | A | 1/1997 | Bland et al. |
| 5,985,336 | A | 11/1999 | Ivey et al. |
| 6,013,286 | A | 1/2000 | Klose |
| 6,183,794 | B1 | 2/2001 | Kaesler et al. |
| 6,221,381 | B1 | 4/2001 | Shelford et al. |
| 6,379,723 | B1 * | 4/2002 | Samuelsson ........... A23K 1/001 426/2 |
| 6,403,549 | B1 | 6/2002 | De Lima et al. |
| 6,482,463 | B1 | 11/2002 | Mologni et al. |
| 6,867,233 | B2 | 3/2005 | Roselle et al. |
| 7,001,625 | B2 | 2/2006 | Van Dyck et al. |
| 7,129,424 | B2 | 10/2006 | Vilhjalmsson et al. |
| 2001/0046979 | A1 | 11/2001 | Roselle et al. |
| 2004/0170729 | A1 | 9/2004 | Xavier Antony et al. |
| 2005/0170052 | A1 * | 8/2005 | Pimentel .................. A23K 3/00 426/321 |
| 2008/0044538 | A1 | 2/2008 | Selse |
| 2011/0182928 | A1 | 7/2011 | Hoogerhout et al. |
| 2012/0148718 | A1 | 6/2012 | Wilson et al. |

FOREIGN PATENT DOCUMENTS

| CL | 19941117 | 10/1995 |
| CL | 201102276 | 4/2012 |
| CN | 1068959 A | 2/1993 |
| CN | 1126942 A | 7/1996 |
| CN | 1229435 A | 9/1999 |
| CN | 1449253 A | 10/2003 |
| CN | 1646008 A | 7/2005 |
| CN | 1656945 A | 8/2005 |
| CN | 102480997 B | 5/2013 |
| EP | 0755195 B1 | 3/1995 |
| EP | 0784439 B1 | 10/1995 |
| EP | 1177726 A1 | 2/2002 |
| EP | 1082025 B1 | 11/2002 |
| EP | 0880403 B1 | 7/2003 |
| EP | 1474996 A1 | 11/2004 |
| EP | 2042041 A2 | 4/2009 |

(Continued)

OTHER PUBLICATIONS

Aldrich., "Rendered Products in Pet Food". Available online at assets.nationalrenderers.org on Nov. 15, 2005.*
Winowiski., "Pellet Quality in Animal Feeds". Available online at www.adiveter.com on Feb. 1, 2001.*
Higgins et al., "Efficacy of Severla Organic Acids Against Molds—Abstract". The Journal of Applied Poultry Research vol. 8, Issue 4, pp. 480-487 (1999).*
Hudha et al., "Effect of acetic acid on growth and meat yield in broilers". Int. J. BioRes. 1(4): 31-35 (Year: 2010).*
Lund, D., 1984, "Influence of time, temperature, moisture, ingredients and processing conditions on starch gelatinization", CRC Crit. Rev. Food Sci. Nutr. 20:249-273.
Moritz, I S. et al, 2001, "Effect of moisture addition at the mixer to a com-soybean-based diet on broiler performance", J. Appl. Poult. Res. 10: 347-353.

(Continued)

*Primary Examiner* — Erik Kashnikow
*Assistant Examiner* — Assaf Zilbering
(74) *Attorney, Agent, or Firm* — Thompson Coburn LLP; Steven M. Ritchey

(57) ABSTRACT

A stock solution for making pelleted livestock feed or pet food, comprising: a) 20-50 wt %. of an organic acid selected from the group consisting of formic, acetic, propionic, butyric and mixtures thereof, b) 15-30 wt. % of ethoxylated castor oil surfactant having an HLB from 4 to 18 and a molar ratio of 1 molecule of castor oil to 40-60 molecules of ethylene oxide, c) 0-20 wt. % of propylene glycol, d) 0-50 wt. % of water, and a pelleted feed made therewith.

9 Claims, No Drawings

(56) References Cited

FOREIGN PATENT DOCUMENTS

| | | |
|---|---|---|
| JP | 47-039523 | 12/1972 |
| JP | 58-113143 | 7/1983 |
| JP | 62-126938 | 6/1987 |
| JP | H06-217705 A | 8/1994 |
| JP | H07-99894 A | 4/1995 |
| JP | 09142980 | 6/1997 |
| JP | H10-182493 A | 7/1998 |
| JP | H11-299432 A | 11/1999 |
| JP | 2002-516071 A | 6/2002 |
| JP | 2005-525117 A | 8/2005 |
| JP | 2005-532049 A | 10/2005 |
| KR | 20100041187 | 4/2010 |
| RU | 2009102526 | 8/2010 |
| UA | 42173 U | 6/2009 |
| UA | 93411 C2 | 2/2011 |
| WO | 95/28091 A1 | 10/1995 |
| WO | 95/28092 A1 | 10/1995 |
| WO | WO 95/28091 | 10/1995 |
| WO | 96/11585 A1 | 4/1996 |
| WO | WO 96/11585 | 4/1996 |
| WO | 97/28896 A1 | 8/1997 |
| WO | WO 97/28896 | 8/1997 |
| WO | 1998/024534 A1 | 6/1998 |
| WO | 99/60865 A1 | 12/1999 |
| WO | WO 99/60865 | 12/1999 |
| WO | 2003/028475 A1 | 4/2003 |
| WO | 2003/088740 A1 | 10/2003 |
| WO | 2006/096825 A2 | 9/2006 |
| WO | 2008/029909 A1 | 3/2008 |
| WO | 2009/041981 A1 | 4/2009 |
| WO | 2010/075280 A2 | 7/2010 |
| WO | WO 2011/025496 | 3/2011 |
| WO | WO 2011025496 A1 * | 3/2011 ............. A23K 1/003 |
| WO | WO 2011066318 | 6/2011 |
| WO | 2011/100292 A1 | 8/2011 |
| WO | 2011/106885 A1 | 9/2011 |

OTHER PUBLICATIONS

Moritz, J.S. et al, 2003 "Feed manufacture and feeding of rations with graded levels of added moisture formulated at different densities", J. Appl. Pout. Res. 12:371-381.
Parker, R. and S.G. Ring, 2001, "Mini Review: Aspects of the Physical Chemistry of Starch", J. Cereal Sci. 34: 1-17.
Udomprasert et al., 2006, "Effect of an Exogenous Emulsifier on Growth Performance in Weanling Pigs" Kasetsart J. (Nat. Sci.) 40 : 652-656 (2006).
Supplemental European Search Report for associated application EP 12805299.
International Search Report for PCT/US12/42848.
Written Opinion of the International Search Authority for PCT/US12/42848.
Behnke, K. c., 1994, "Factors affecting pellet quality" pp. 44-54, Proc. Maryland Nutr. Conf. Feed Manuf., College Park, MD. Maryland Feed Ind. Council. and Univ. Maryland, College Park.
Briggs; J.L., D.E. Maier, B.A. Watkins, and K.C. Behnke, 1999, "Effect of ingredients and processing parameters on pellet quality", Poult. Sci. 78: 1464-1471.
Fairchild, F. and D. Greer, 1999, Pelleting with precise mixer moisture control, Feed Int. 20 (8): 32-36.
Fairfield, D., 2003 "Pelleting for Profit Part I", Feed and Feeding digest 54 (6) 2003.
Fruijtier-Polloth, C., 2005, "Safety assessment on polyethylene glycols (PEGs) and their derivatives as used in cosmetic products", Toxicology 214: 1-38.
Hott et al, 2008, "The effect of moisture addition with a mold inhibitor on pellet quality, feed manufacture and broiler performance", J. Appl. Poult. Res. 17:262-271.
Jensen L., L.R. Merill, C.Y. Reddy and J. McGinnis, 1962, "Observations on eating patterns and rate of food passage of birds fed pelleted or unpelleted diets", Poult. Sci. 41:1414-1419.

"Des Argiles Pour Absorber et Adsorber", Extract from La Revue de L'alimentation animale, Jan.-Feb. 2007, 2 pages, No. 603.
"Emulsifier Technology for Effective Feed Production", Akzo Nobel Bredol Brochure, 2008.
Akzo Nobel Chemicals International B.V. Opposition Against EP2473063, dated Jan. 12, 2018.
Akzo Nobel Safety Data Sheet for Bredol 691, May 25, 2005, 4 pages.
Barbosa et al., "Counting of Viable Cluster-Forming and Non Cluster-Forming Bacteria: A Comparison Between the Drop and the Spread Methods", Journal of Microbiological Methods, 1995, pp. 39-50, vol. 22.
Certificate of Confirmity for Preparation of a Kind Used in Animal Feeding for Poultry Feed, Novus Deutschland GmbH, dated Jan. 22, 2008, PSI Ref. No. 223959, 1 page.
Commission Directive of Apr. 12, 1991 Amending the Annexes to Council Directive 70/524/EEC Concerning Additives in Feeding-Stuffs, Official Journal of the European Communities, May 18, 1991, pp. 1-42.
Committee for Veterinary Medical Products Polyoxyl Castor Oil Polyoxyl Hydrogenated Castor Oil Summary Report, The European Agency for the Evaluation of Medicinal Products, Jun. 1999, 3 pages.
Compound Cattle Feed: A Balanced Supplement for Increasing Growth and Milk Production, National Diary Development Board Anand, Jun. 2006, 4 pages.
Correspondence to European Patent Office re EP Applicaiton No. 128052099.0 response to Nov. 4, 2014 Communication, HGF, May 5, 2015, 3 pages.
Declaration of Uwe Ranft, General Manager for Europe and the Middle East for Novus International, Inc. Jan. 2018, 2 pages.
Definition of Compound Feed, Dictionary of Agriculture 2nd Edition, p. 58, Fitzroy Dearborn Publishers.
European Union Reference Laboratory for Feed Additives, Evaluation Report on the Analytical Methods Submitted in Connection with the Application for Authorisation of a Feed Additive According to Regulation (EC) No. 1831/2003, European Commission, Spetember 30, 2013 pp. 1-9.
Freitag, "Organic Acids and Salts Promote Performance and Health in Animal Husbandry", Acidifiers in Animal Nutrition: A Guide for Feed Preservation and Acidification to Promote Animal Performance, 2008, pp. 1-12, Nottingham University Press.
Immerseel et al., "The Use of Organic Acids to Combat *Salmonella* in Poultry: A Mechanistic Explanation of the Efficacy", Avian Pathology, Jun. 2006, pp. 182-188, vol. 35, No. 3.
Invoice for NATCOR S.N.C. dated Nov. 16, 2007, delivery date Nov. 20, 2007, No. RE081654, 2 pages.
Invoice for BOCM Pauls Ltd. dated Aug. 21, 2007, delivery date Aug. 24, 2007, No. LI081130, 2 pages.
Invoice for Dossch Sp. zo.o dated Mar. 14, 2008, delivery date Mar. 17, 2008, No. RE082385, 2 pages.
Invoice for Novus International Pte Ltd. dated Feb. 13, 2008, delivery date Mar. 17, 2008, No. LI082257, 2 pages.
Invoice for Nutripalm-Euralis dated Jun. 12, 2007, delivery date Jun. 15, 2007, No. LI080457, 2 pages.
Invoice for Piensos El Jucar S.L. dated Jun. 26, 2007, delivery date Jul. 3, 2007, No. LI080631, 2 pages.
Invoice for Vollkraft Mischfutterwerke GmbH dated Sep. 20, 2007, deliver date Sep. 21, 2007, No. LI081334, 2 pages.
List of Feed Ingredients, Mosselman Oleochemicals, Mar. 24, 2017, pp. 1-8.
List of the Authorised Additives in Feedingstuffs, Official Journal of the European Union, Feb. 25, 2004, pp. 1-144.
Novus International, Inc. Opposition Against EP2473063, dated Jan. 12, 2018.
Spreadsheet of 2008 Sales for Surf-Ace, 5 pages.
Steven Zeman International, Inc. Opposition Against EP2473063, dated Jan. 12, 2018.
Stonerock, "Possibilities of *Salmonella* Control with the Aid of Acidifiers", Acidifiers in Animal Nutrition: A Guide to Feed Preservation and Acidification to Promote Animal Performance, 2008, pp. 21-30, Nottingham University Press.

(56) References Cited

OTHER PUBLICATIONS

Surf-Ace Product Information Data Sheet for Premixure (multi-translations) dated Jul. 4, 2008, 1 page.
Surf-Ace Product Information Data Sheet for Preservative Premixure dated Oct. 25, 2007, 1 page.
Surf-Ace Product Information Data Sheet for Preservative Premixure Oct. 24, 2008, 1 page.
Surf-Ace Trial 1 Results for Pig Finisher Feed, Ref. No. GB12007, 2 pages.
Surf-Ace Trial 2 Results for Ruminant Feed, Ref. No. GB32007, 3 pages.
Surf-Ace Trial 3 Results for Layer Feed, Ref. No. IT62007, 2 pages.
Surf-Ace Trial 4 Results for Ruminant Feed, Ref. No. IT72007, 2 pages.
Xu et al., "The Antibacterial Mechanism of Carvacrol and Thymol Against *Escherichia coli*", Letters in Applied Microbiology, 2008, pp. 174-179, vol. 47.
Moritz et al., "Effect of Formulation Density, Moisture, and Surfactant on Feed Manufacturing, Pellet Quality, and Broiler Performance", The Journal of Applied Poultry Research, Jun. 2002, pp. 155-163, vol. 11, No. 2.
Fairchild et al., "The Effect of Precise Moisture Control in the Mixer on Pellet Production", Meeting AgriChem, Inc., 1999, 5 pages.
"Emulsifiers and their Differences", May 21, 2005, available online at www.cosmeticsathome.co.uk.
Akbari et al., "Effect of Acetic Acid Administration in Drinking Water on Performance Growth Characteristics and Ileal Microflora of Broiler Chickens", Journal of Science and Technology in Agriculture and Natural Resources, 2004, pp. 148, vol. 8 No. 3.
English Translation of Office Action in related Japanese Application No. 2012-526702, dated Jul. 23, 2013.
Henderson et al., "Early Events in the Pathogenesis of Avian Salmonellosis", Infection and Immunity, 1999, pp. 3580-3586, vol. 67 No. 7.
Humphrey et al., "Contamination of Egg Shell and Contents with *Salmonella enteritidis*", International Journal of Food Microbiology, 1994, pp. 31-40, vol. 21 No. 1-2.
International Search Report and Written Opinion for PCT/US2007/080001 dated Jun. 25, 2008.
International Search Report and Written Opinion for PCT/US2009/055472 dated May 28, 2010.
International Search Report and Written Opinion for PCT/US2011/025496 dated Nov. 22, 2011.
JPO English Translation of Japanese Unexamined Patent Pub. No. 07-099894.
JPO English Translation of Japanese Unexamined Patent Pub. No. 10-182493.
JPO English Translation of Japanese Unexamined Patent Pub. No. 11-299432.
JPO English Translation of Japanese Unexamined Patent Pub. No. 2002-516071.
JPO English Translation of Japanese Unexamined Patent Pub. No. 2005-525117.
JPO English Translation of Japanese Unexamined Patent Pub. No. 2005-532049.
JPO English Translation of Patent Abstract of Japan and Japanese Unexamined Patent Pub. No. 06-217705.
Keller et al., "*Salmonella enteritidis* Colonization of the Reproductive Tract and Forming and Freshly Laid Eggs of Chickens", Infection and Immunity, 1995, pp. 2443-2449, vol. 63 No. 7.
Paster, "A Commercial Scale Study of the Efficiency of Propionic Acid and Calcium Propionate as Fungistats in Poultry Feed", Poultry Science, 1979, pp. 572-576, vol. 58.
Rahnema et al., "Preservation and Use of Chemically Treated High-Moisture Corn by Weanling Pigs", Journal of Production Agriculture, 1992, pp. 458-461, vol. 5 No. 4.
Smith, "Mycotoxins and Poultry Management", World's Poultry Science Journal, 1982, pp. 201-212, vol. 38 No. 3.
Tabib et al., "Effect of Pelleting Poultry Feed on the Activity of Molds and Mold Inhibitors", Poultry Science, 1984, pp. 70-75, vol. 63.
Van Immerseel et al., "The Use of Organic Acids to Combat *Salmonella* in Poultry: a Mechanistic Explanation of the Efficacy", Avian Pathology, 2006, pp. 182-188, vol. 35 No. 3.
Fairchild et al., "Pelleting with Precise Mixer Moisture Control", Feed International, 1999, pp. 32-36, vol. 20 No. 8.

* cited by examiner

COLD WEATHER FORMULATION FOR CONDITIONING ANIMAL FEED

CROSS REFERENCE TO RELATED APPLICATIONS

This application is a national stage entry of PCT/US12/42848, filed Jun. 17, 2012, which published as WO2013003080 on Jan. 3, 2013, and claims priority to provisional Application No. 61/501,225, filed Jun. 26, 2011, entitled "Cold Weather Formulation for Conditioning Animal Feed".

BACKGROUND OF THE INVENTION

1. Field of the Invention

A liquid formulation for conditioning animal feed.

2. Background

Most of the animal industry uses pelleted feed. Pelletization is a transformation of powdered feed (mash feed) into small granules having all the required nutrients for an animal. Typically, production from the raw materials through pelletization accounts for 60-70% of the cost of making animal feeds. Finding a procedure or modification to decrease the cost of feed production without reducing feed quality has been one of the most important areas of research in the animal industry. Several studies indicate that pelleting improves feed conversion by as much as 12%. This improvement in performance is attributed to decreases in feed wastage, ingredient segregation, and energy expenditures by the animal while eating (Behnke, K. C., 1994, "Factors affecting pellet quality" pp. 44-54, Proc. Maryland Nutr. Conf. Feed Manuf., College Park, Md. Maryland Feed Ind. Council. and Univ. Maryland, College Park. Briggs; J. L., D. E. Maier, B. A. Watkins, and K. C. Behnke, 1999, "Effect of ingredients and processing parameters on pellet quality", Poult. Sci. 78: 1464-1471). Durable pellets reduce waste, reduce segregation, improve palatability and allow larger meals to be eaten in less time. Chicks given mash feed spent 14.3% of a 12 hour day eating vs. 4.7% for pellet-fed chicks (Jensen L., L. H. Merin, C. V. Reddy and J. McGinnis, 1962, "Observations on eating patterns and rate of food passage of birds fed pelleted or unpelleted diets", Poult. Sci. 41:1414-1419).

The process of pelletization requires a conditioning step, which involves steam to gelatinize the starch in the diet and to produce better binding, thereby increasing the durability of the pellets. Starch gelatinization is a process in which water, in the form of steam, is diffused into the starch granules causing swelling (Parker, R. and S. G. Ring, 2001, "Mini Review: Aspects of the Physical Chemistry of Starch", J. Cereal Sci. 34: 1-17). As the gelatinized starch cools it forms a gel, which acts as an adhesive, causing particle binding (Lund, D., 1984, "Influence of time, temperature, moisture, ingredients and processing conditions on starch gelatinization", CRC Crit. Rev. Food Sci. Nutr. 20:249-273). The addition of high amounts of moisture also lowers the onset temperature required for starch gelatinization to occur. Gelatinized starch has generally been thought to improve enzymatic access to glucosidic linkages and consequently improve digestibility in the animal (Parker, R. and S. G. Ring, 2001, "Mini Review: Aspects of the Physical Chemistry of Starch", J. Cereal Sci. 34: 1-17).

Feed pellets are damaged during loading, unloading, storage, conveying and transferring to feeders. The handling and transport of the feed often results in a reduction in the percentage of intact pellets, increased broken pellets and an increase in feed fines. It is thought that for every 10% increase in fines, there is a loss of one point of feed conversion, which then requires more feed to be eaten to produce the same amount of meat (McKinney et al, 2004: Harper). The present invention provides excellent pellet properties, in which the percent fines are reduced at least 10% compared to a control sample treated with water, more typically 15% to 20%.

During conditioning, steam adds up to 6% moisture to feed. Each percent of moisture added to the feed through steam raises the mash feed temperature about 23° C., which improves the conditioning process by optimizing pellet mill operation and pellet durability (Fairfield, D., 2003 "Pelleting for Profit-Part 1", Feed and Feeding digest 54 (6) 2003). This added moisture is lost when the pellet is cooled down. Several studies have shown that the addition of water beyond the moisture added during the conditioning process can improve pelletization (Fairchild, F. and D. Greer, 1999, "Pelleting with precise mixer moisture control", Feed Int. 20 (8): 32-36; Moritz, J. S et al, 2003 "Feed manufacture and feeding of rations with graded levels of added moisture formulated at different densities", J. Appl. Pout. Res. 12:371-381). Motitz et al and Hott et al reported an increase in PDI and a decrease in energy usage by the addition of 2.5 to 5% moisture to a corn-soybean based diet at the mixer (Moritz, J. S. et al, 2001, "Effect of moisture addition at the mixer to a corn-soybean-based diet on broiler performance", J. Appl. Poult. Res. 10: 347-353; Hott et al, 2008, "The effect of moisture addition with a mold inhibitor on pellet quality, feed manufacture and broiler performance", J. Appl. Poult. Res. 17:262-271).

Moisture addition to the feed at the mixer was shown to increase pellet quality and decrease pellet mill energy consumption. Moisture addition was also found to reduce the temperature difference ΔT) between the conditioned mash and the hot pellets, which indicates a decrease in die wear. Moisture added to feed in a mixer becomes bound in the various heat-related reactions, such as starch gelatinization resulting in an increased PDI. This moisture is not as easily removed from pellets as moisture added during the conditioning process. However, the extra moisture can migrate to the pellet surface, which can result in a significant molding hazard. The use of a surfactant in moisture additives facilitates the absorption of water into the mash feed, thereby reducing the molding hazard.

Animal feed manufacturers currently use water, which does not penetrate totally into the mash feed. We have found that addition of a non-ionic surfactant improves this water penetration, thereby improving pellet quality as well as pelletization parameters. For poultry and swine integrators the need for fungicides is of no economic importance because feed is consumed within 3-5 days of manufacturing, which is insufficient time for mold to grow.

The present invention is a highly concentrated formulation of ethoxylated castor oil plus chemicals to prevent damage from extreme cold temperatures. Because the surfactant formula is so concentrated, its transportation and handling costs are low, so this formula offers significant cost advantages to feed producers operating in cold climates.

Ethoxylated castor oil emulsifier is produced by the reaction of castor oil with ethylene oxide. Ethoxylated castor oil emulsifiers are of various chain lengths, depending on the quantity of ethylene oxide used during synthesis. The molar ratio can vary between 1 molecule of castor oil to 1-200 molecules of ethylene oxide, producing an ethoxylated castor oil emulsifier named according to the formula PEG-x (PolyEthylene Glycol, where x is the number of ethylene oxide moieties) castor oil emulsifier (Fruijtier-Polloth, C., 2005, "Safety assessment on polyethylene glycols (PEGs) and their derivatives as used in cosmetic products", Toxicology 214: 1-38). These emulsifiers have been widely used to solubilize water-insoluble drugs for human and animal treatments. They are non-volatile, stable compounds, which do not hydrolyze or deteriorate on storage.

Castor oil is obtained from the seeds of *Ricinus communis* and consists primarily of the triglycerides of ricinoleic, isoricinoleic, stearic and dihydroxystearic acids. Castor oil is 90% ricinoleic acid (12-Hydroxyoleic acid), a nontoxic, biodegradable and renewable resource. Other emulsifiers with similar properties can be derived from different oils, e.g. soybean, canola, tree tall, and other vegetables oils. Synthetic emulsifiers can also be utilized provided they are approved for use in animal feed.

Several PCT applications have been filed for uses of ethoxylated castor oil surfactants in feed ingredients and complete feed.

WO 99/60865 relates to the use of a surfactant-water emulsion that is added to animal feed before or after heat treatment. The emulsion helps maintain or reduce water lost during heat treatment. This emulsion consists of 1 to 8 parts water and 0.005 to 0.5 parts surfactant, and has a melting point of greater than 15° C. The present invention is a solution, rather than an emulsion, and remains a clear solution at freezing temperatures.

Patent WO 97/28896 teaches an aqueous mixture of molasses, fat, oil, acids and water which contains an ethoxylated castor oil as a dispersant that prevents separation of the mixture. The present invention contains no molasses and uses selected types of ethoxylated castor oil (PEG-40, PEG-60) to improve cold weather properties, while maintaining pelletization performance.

WO 96/11585 discloses an animal feed containing a polyethylene glycol compound that includes an ethoxylated castor oil having molecular weight of 5,000-11,000. In one embodiment the ethoxylated castor oil of the invention has sixty ethoxylated molecules, and a molecular weight of 3,700-3,850.

WO 95/28091 describes adding ethoxylated castor oil to conventional dry animal feed, which is said to improve availability of nutritious substances, to increase animal growth and to decrease mortality. The ethoxylated castor oil has from 8-35 ethoxylated molecules which differs from ethoxylated castor oil having 40-60 ethoxylated molecules, as in the present invention.

U.S. Pat. No. 6,482,463 discloses an ethoxylated castor oil for animal feed to improve the availability of nutritious substances. The ethoxylated castor oil is said to aid in the formation of fat micelles in the intestinal tract, thus improving fat digestion/absorption. Typical inclusion rates in the feed are 100 ppm of ethoxylated castor oil, compared to 11-23 ppm in the present invention. At the proposed inclusion rate, the present invention improves pelleting process efficiency and pellet quality but has no apparent effect on the availability of nutritious substances.

These patents mentioned above describe adding ethoxylated castor oil surfactant, preferably as an emulsion, to improve the digestibility of hydrophobic substances in animal feeds, but as formulated they do not provide benefits for the production process, such as decreased energy consumption, improved pellet quality, or high solubility even in cold weather.

The present invention provides a concentrated surfactant solution that is resistant to harsh temperatures changes, and, when added to feed before pelleting, improves milling efficiency and pellet quality.

Various patents and publications are referenced throughout this specification. The disclosures of each document are hereby incorporated by reference in its entirety.

SUMMARY OF THE INVENTION

An object of the invention is to provide a formulation that improves the pelleting process and/or extrusion processes of animal feed.

Another object is to provide a method for making pelleted animal feed, comprising:
preparing a concentrated or stock solution, comprising:
  a) 20-50 wt %. of an organic acid selected from the group consisting of formic, acetic, propionic, butyric and mixtures thereof,
  b) 15-30 wt. % of ethoxylated castor oil surfactant having an HLB from 4 to 18 and a molar ratio of 1 molecule of castor oil to 40-60 molecules of ethylene oxide,
  c) 0-20 wt. % of propylene glycol,
  d) 0-50 wt. % of water, adding 5 to 200 parts of water, to prepare a heat-treating composition, and applying an effective amount of said heat-treating composition to an animal feed, with sufficient heating to pelletize or extrude the feed.

Another object of the invention is to provide a pelleted animal feed made by a process comprising: preparing a concentrated or stock solution, comprising:
  a) 20-50 wt %. of an organic acid selected from the group consisting of formic, acetic, propionic, butyric and mixtures thereof,
  b) 15-30 wt. % of ethoxylated castor oil surfactant having an HLB from 4 to 18 and a molar ratio of 1 molecule of castor oil to 40-60 molecules of ethylene oxide,
  c) 0-20 wt. % of propylene glycol,
  d) 0-50 wt. % of water,
adding 5 to 200 parts water to prepare a heat-treating composition, and applying an effective amount of said heat-treating composition to an animal feed, with sufficient heating to pelletize or extrude the feed.

Benefits of the invention include (i) Percent fines are improved at least 5% compared to a control sample treated with water, preferably at least 15% or 40%. (ii) Energy consumption is improved at least 10% compared to a control sample treated with water, preferably at least 20% or 25%. (iii) Pellet moisture is improved at least 0.4% compared to a control sample treated with water, preferably at least 0.5% or 0.6%.

Most importantly, the present invention greatly reduces problems in transportation and storage of the stock solution, because it remains in solution down to about −10 to −15° C. or lower. It has no anti-fungal activity, which is not necessary for animal integrators and pet food companies, but retains the advantages of good gelatinization, high pellet quality, and low energy consumption during pelletization or extrusion.

DESCRIPTION OF THE PREFERRED EMBODIMENTS

The present invention is a mixture of ethoxylated fatty acid surfactant and excipients, which is stable at cold temperatures making it useful for northern feedlot operations under harsh winter conditions. At the same time it provides excellent pellet quality (starch gelatinization, pellet durability, moisture retention) and feed mill parameters (feed throughput, energy consumption).

Definitions

"Weight percent" of a component is based on the total weight of the formulation or composition in which the component is included.

"Organic acid" includes formic, acetic, propionic, butyric and other $C_1$ to $C_{24}$ fatty acids, and mono-, di-, or triglycerides of $C_1$ to $C_{24}$ fatty acids.

The term "effective amount" means an amount capable of performing the function or having the property for which the effective amount is expressed, such as a non-toxic but sufficient amount to provide the desired level of pelletizing or milling. Effective amounts can be determined by one of ordinary skill in the art using only routine experimentation.

When pelletizing feed, steam is injected into the mash feed then the mass is pelleted. In extruded feed, steam is injected into the mash feed under pressure, then the mass is extruded and then pelleted. Extruded feed is less dense than mash feed.

Formulations of the present invention may vary not only in the concentrations of major components, e.g., organic acids, but may also be modified by adding or deleting a type of organic acid and/or a type of surfactant and/or a type of excipient.

The terms "synergistic effect" and "synergy" mean improved pelletizing effects when the ingredients are added as a mixture compared to the individual components.

Composition(s)

In general, the stock solution contains:
a) 20-50 wt. %. of an organic acid selected from the group consisting of formic, acetic, propionic, butyric and mixtures thereof,
b) 15-30 wt. % of ethoxylated castor oil surfactant having an HLB from 4 to 18 and a molar ratio of 1 molecule of castor oil to 40-60 molecules of ethylene oxide,
c) 0-20 wt. % of propylene glycol,
d) 0-50 wt. % of water, to which is added 5 to 200 parts water, preferably 10-15 parts, to prepare a heat-treating composition shortly before use; then applying an effective amount of said heat-treating composition to an animal feed with sufficient heating to pelletize the feed.

The surfactant is a non-ionic ethoxylated castor oil compound having 40 to 60 ethylene molecules distributed normally around the mean, preferably a mean of 60, and having an HLB from 4 to 18, preferably 13-16. The surfactant concentration in the stock solution is 15-30 wt. %, preferably 20-25 wt. %.

In order to dissolve the ethoxylated castor oil and keep it in solution at low temperatures, the stock solution contains 20 to 50 wt. % of organic acids, preferably 10-30 wt. %. Exemplary acids include acetic acid, propionic acid and butyric acid. The composition may also contain 0 to 50 wt. % water, preferably 20-35 wt. %; and 0 to 50 wt. % propylene glycol, preferably 20-35 wt. %.

The composition is diluted with 5 to 200 parts of water to form a heat-treating composition which is a 0.5 to 20 wt. % aqueous mixture, preferably a 0.5 to 10 wt. % mixture. The acids of a) may be buffered or unbuffered. The buffer may be calcium hydroxide, ammonium hydroxide or sodium hydroxide.

The heat-treating composition is applied to the animal feed in an amount of 0.25 to 20 wt. % based on the weight of the starting animal feed, preferably 1 to 10 wt. %. More preferably the aqueous mixture is applied to the non-pelleted feed in amounts of 1 to 5 wt. % based on the total feed, or 1 to 3 wt. %.

Methods

The present invention maintains moisture levels in the pelletized feed higher than moisture levels in untreated feeds, or in feeds produced using conventional pelletizing methods. The aqueous mixture of the invention is applied to feed ingredients before entering the mixer. The aqueous mixture may be applied to the unmixed feed ingredients in the mixer, or applied during the mixing of the feed ingredients, and may be applied during the wet mixing cycle.

The aqueous mixture of the invention is applied by a spray nozzle so as to provide a uniform and homogeneous distribution of the mixture throughout the feed.

EXAMPLE 1

The purpose of these experiments was to select an ethoxylated castor oil derivative that reduces the surface tension of water and is stable in a mixture of buffered organic acids.

The effect of ethoxylated castor oil products on the surface tension of water was compared to that of polysorbate 80. The surfactants were added to water at a 10% concentration, and surface tension was measured on a Fisher Surface Tensiomat Model 21. The surface tensions of these 10% solutions were measured as follows:

| Treatment | Surface Tension (dynes/cm) |
|---|---|
| CO-60 (Protachem) | 41.35 |
| CO-200 (Protachem) | 41.03 |
| CO-40 (Stepantex) | 40.25 |
| Polysorbate-80 (T-maz) | 40.57 |
| Water | 73.45 |

It was observed that all of the surfactants decreased the surface tension of water about equally. Surfactants were added to two different buffered mixtures of organic acids (Mixture S or H) at a concentration of 0.5 wt. % or 2.25 wt. %. Visual observations were made at room temperature to record any precipitation or solubility problems. The results were as follows:

| | Treatment | Surfactant % | Comments |
|---|---|---|---|
| 1 | Mixture S control | 0 | Clear |
| 2 | Mixture S + CO-60 | 0.5 | Clear |
| 3 | Mixture S + CO-200 | 0.5 | Clear, surfactant sediments at bottom |
| 4 | Mixture S + CO-40 | 0.5 | Clear |
| 5 | Mixture S + C-EL | 0.5 | Clear |
| 6 | Mixture S + T-maz | 0.5 | Clear |
| 7 | Mixture H control | 0 | Clear |
| 8 | Mixture H + CO-60 | 2.25 | Clear |
| 9 | Mixture H + CO-200 | 2.25 | Hazy, surfactant sediments at bottom |
| 10 | Mixture H + CO-40 | 2.25 | Clear |
| 11 | Mixture H + C-EL | 2.25 | Clear |
| 12 | Mixture H + T-maz | 2.25 | Clear |

CO-200 did not remain soluble at 0.5% or 2.25% in either of the buffered acid solutions.

EXAMPLE 2

The purpose of this experiment was to determine the solubility of several non-ionic surfactants when added to a mixture of buffered organic acids stored at different temperatures. Buffered acid mixtures S and H, as in Example 1, were used in combination with Tmaz, or castor oil surfactants Protachem CO-60, Stepantex CO-40 and Cremophor EL. The surfactant concentration was 2.25 wt. %. Product stability was observed after storing the mixtures for 7 days at −20° C., 1° C., 50° C., and room temperature.

| Treatment | Temperature | | | |
|---|---|---|---|---|
| | 24° C. | −20° C. | 1° C. | 50° C. |
| 1 Mixture S + Tmaz | Clear | Clear | Clear | Cloudy |
| 2 Mixture S + CO-40 | Clear | Clear | Clear | Clear |
| 3 Mixture S + CO-60 | Clear | Clear | Clear | Clear |
| 4 Mixture S + C-EL | Clear | Clear | Clear | Clear |
| 5 Mixture H + Tmaz | Clear | Clear | Clear | Separation, cloudy when mixed |
| 6 Mixture H + CO-40 | Clear | Clear | Clear | Separation, cloudy when mixed |
| 7 Mixture H + CO-60 | Clear | Cloudy | Hazy | Clear |
| 8 Mixture H + C-EL | Clear | Clear | Clear | Separation, cloudy when mixed |

The ethoxylated castor oil surfactants appeared stable when mixed in buffered acid mixture S and stored at different temperatures. In mixture H, exposure to elevated temperatures resulted in product separation issues with the exception of CO-60

EXAMPLE 3

The purpose of this experiment was to determine the effects of surfactant:acid ratio, in the products of Example 2, on water surface tension and their miscibility. Ethoxylated castor oil CO-300 was also tested. The water surface tension was determined using 5% surfactant on buffered acid mixtures S and H. Miscibility of the samples was observed after a heat shock treatment of 15 minutes at 85° C. This test resulted in precipitation of the surfactant.

Results of the heat shock test were as follows:

| | Treatment | Surface Tension (dynes/cm) 5% solution | Visual Observations | |
|---|---|---|---|---|
| | | | 15 minutes at 85° C. | after heat shock |
| 1 | Mixture S no surfactant | 69.0 | Clear | Clear |
| 2 | Mixture S + CO-60 | 51.3 | Clear | Clear |
| 3 | Mixture S + CO-200 | 54.4 | Clear | Clear |
| 4 | Mixture S + CO-40 | 49.8 | Clear | Clear |
| 5 | Mixture S + C-EL | 50.4 | hazy | Clear |
| 6 | Mixture S + Tmaz | 50.2 | hazy | Clear |
| 13 | Mixture S + CO-300 | 51.6 | hazy | Clear |
| 7 | Mixture H no surfactant | 57.7 | Clear | Clear |
| 8 | Mixture H + CO-60 | 46.5 | Clear | Clear |
| 9 | Mixture H + CO-200 | 51.5 | Clear | Clear |
| 10 | Mixture H + CO-40 | 46.4 | Clear | Clear |
| 11 | Mixture H + C-EL | 45.8 | hazy | Clear |
| 12 | Mixture H + Tmaz | 46.8 | hazy | Clear |
| 14 | Mixture H + CO-300 | 48.7 | hazy | Clear |

Mixtures S and H with surfactants C-EL T-maz and CO-300 were cloudy when heat shocked. They all returned to clear after cooling down for 30 minutes. Mixtures containing CO-40 or CO-60 ethoxylated castor oil resulted in better stability.

EXAMPLE 4

The purpose of this experiment was to compare the effects of CO-60 surfactant on milling parameters and pellet quality and to compare T-maz and CO-60 using Mixture S. Different surfactants were diluted in buffered (Mixture S) or non-buffered (Mixture A) organic acids at a 2.25% inclusion rate. Mixture W was an aqueous plus surfactant mixture.

Buffered or non-buffered mixtures were sprayed during the mixing cycle at an inclusion rate of 1% (5:95 solution). The mixing cycle consisted of 3 minutes dry and 2 minutes wet mix. There were three repetitions for each type of treatment. One repetition was done per day, the trial lasted for three days. The same type of feed was used for all treatments on all days in order to decrease experimental variation. Feed mill production efficiency parameters and pellet quality are reported in the following tables.

| Feed Mill Parameter[a] | Control | Mixture S + Tmaz | Mixture S + CO-60 | Mixture A + CO-60 | Mixture W + CO-60 |
|---|---|---|---|---|---|
| Pellet Motor (amp) | 63.52 ± 1.18 | 62.40 ± 0.49 | 62.73 ± 0.65 | 63.67 ± 0.43 | 64.31 ± 1.30 |
| Feed Rate (lbs/hr) | 2659 ± 97.3 | 2607 ± 56.4 | 2597 ± 59.2 | 2596 ± 61.9 | 2634 ± 54.7 |
| Feed Rate Observed (ton/hr) | 1.33 ± 0.05 | 1.30 ± 0.03 | 1.30 ± 0.03 | 1.32 ± 0.03 | 1.32 ± 0.03 |
| Pellet Temperature (F.) | 199.1 ± 032 | 196.3 ± 1.02 | 195.1 ± 2.76 | 195.6 ± 0.77 | 198.8 ± 0.81 |
| Delta "T" | 7.18 ± 2.49 | 6.93 ± 2.63 | 7.27 ± 2.27 | 7.78 ± 2.15 | 9.36 ± 1.57 |

[a]Mean ± S.E.

| Feed Quality Parameters[a] (%) | Control | Mixture S + Tmaz | Mixture S + CO-60 | Mixture A + CO-60 | Mixture W + CO-60 |
|---|---|---|---|---|---|
| Starch | 51.75 ± 0.341[y] | 53.30 ± 0.388[x] | 52.26 ± 0.299[xy] | 52.46 ± 0.294[xy] | 52.91 ± 0.362[xy] |
| Gelatinization | 13.25 ± 0.251[y] | 14.51 ± 0.381[x] | 12.33 ± 0.599[y] | 12.65 ± 0.366[y] | 12.72 ± 0.145[y] |
| Cooked starch | 25.61 ± 0.500[y] | 27.19 ± 0.559[x] | 23.58 ± 1.089[yz] | 24.12 ± 0.734[yz] | 24.01 ± 0.304[yz] |
| Pellet Moisture | 12.68 ± 0.065[z] | 13.12 ± 0.082[y] | 13.45 ± 0.15[x] | 13.28 ± 0.41[xy] | 13.27 ± 0.044[xy] |
| PDI | 96.07 ± 0.09 | 95.90 ± 0.29 | 96.43 ± 0.29 | 96.10 ± 0.15 | 96.03 ± 0.23 |
| Water Activity | 0.694 ± 0.006[y] | 0.707 ± 0.006[xy] | 0.710 ± 0.001[x] | 0.695 ± 0.007[y] | 0.710 ± 0.003[x] |

[a]Mean ± S.E.
[xyz]Values on the same row with different superscripts are significantly different ($p < 0.05$)

There were no differences in the feed milling efficiency between the control and the other treatments, but the addition of the mixtures to the feed improved product shrinkage during the cooling process (i.e., better moisture retention). Feed treated with Mixture S+CO-60 had higher moisture retention than the same mixture with Tmaz and similar to the other mixtures.

The Mixture W with CO-60 worked equally well compared to the acidic and buffered mixtures. Since it was observed that the combination of water with CO-60 performed as well as combining buffered or non-buffered acids, the next studies were done to find out a concentrated formulation that required less water.

EXAMPLE 5

From Example 4, it was observed that an aqueous solution had the same milling benefits as the buffered and acidic solutions. However a 2.25 wt. % aqueous solution of C-60 (Mixture W) will freeze at low temperatures, and industry prefers products which are more concentrated than 2.25 wt. %. The following studies were carried out to formulate a more concentrated product that resists freezing at low temperatures (−20° C.). Ten formulas with different concentrations of acetic acid and propylene glycol were prepared and visually tested for cloudiness and freezing resistance.

|  | % Formulation | | | | | | | | | |
|---|---|---|---|---|---|---|---|---|---|---|
| Ingredient | # 1 | # 2 | # 3 | # 4 | # 5 | # 6 | # 7 | # 8 | # 9 | # 10 |
| Dye | 1.50 | 1.50 | 1.50 | 1.50 | 1.50 | 1.50 | 1.50 | 1.50 | 1.50 | 1.50 |
| CO-60 | 22.50 | 22.50 | 22.50 | 22.50 | 22.50 | 22.50 | 22.50 | 22.50 | 22.50 | 22.50 |
| Acetic Acid (56%) | 0.00 | 0.00 | 5.00 | 5.00 | 10.00 | 10.00 | 20.00 | 20.00 | 40.00 | 40.00 |
| Propylene Glycol | 30.00 | 60.00 | 15.00 | 30.00 | 15.00 | 30.00 | 15.00 | 30.00 | 15.00 | 30.00 |
| Water | 46.00 | 16.00 | 56.00 | 41.00 | 51.00 | 36.00 | 41.00 | 26.00 | 21.00 | 6.00 |
| TOTAL | 100.00 | 100.00 | 100.00 | 100.00 | 100.00 | 100.00 | 100.00 | 100.00 | 100.00 | 100.00 |

Formulas #7 and #9 did not freeze at −20° C. but presented some cloudiness but were selected for further study.

EXAMPLE 6

Four different formulations were compared to samples #7 and #9 from Example 5.

|  | % Formulation | | | | | |
|---|---|---|---|---|---|---|
| Ingredients | # 7 | # 9 | # 12 | # 13 | # 14 | # 15 |
| Dye | 1.00 | 1.00 | 1.00 | 1.00 | 1.00 | 1.00 |
| CO-60 | 22.50 | 22.50 | 22.50 | 22.50 | 22.50 | 22.50 |
| Acetic Acid (56%) | 20.00 | 40.00 | 25.00 | 30.00 | 45.00 | 50.00 |
| Propylene Glycol | 15.00 | 15.00 | 10.00 | 5.00 | 10.00 | 5.00 |
| Water | 41.50 | 21.50 | 41.50 | 41.50 | 21.50 | 21.50 |

Formulas #7 and #13 did not freeze at −20° C. but presented some cloudiness.

EXAMPLE 7

Four new formulations were compared to Formulas #7 and #13 from Example 6.

|  | % Formulation | | | | | | |
|---|---|---|---|---|---|---|---|
| Ingredients | # 7 | # 13 | # 13 A | # 13 B | # 13 C | # 13 D | # 13 E |
| Dye | 1.00 | 1.00 | 1.00 | 1.00 | 1.00 | 1.00 | 1.00 |
| CO-60 surfactant | 22.50 | 22.50 | 22.50 | 22.50 | 22.50 | 22.50 | 22.50 |
| Acetic Acid (56%) | 20.00 | 30.00 | 30.00 | 30.00 | 40.00 | 50.00 | 45.00 |
| Propylene Glycol | 15.00 | 5.00 | 10.00 | 15.00 | 10.00 | 5.00 | 10.00 |
| Water | 41.50 | 41.50 | 36.50 | 31.50 | 26.50 | 21.50 | 21.50 |

Formulas #13, #13 A, #13B and #13D did not freeze at −20° C. only #7 presented some cloudiness.

EXAMPLE 8

Formulas #13, #13 A, #13B and #13D were sent to an outside laboratory for the determination of freezing points. It was observed that formula #13B had the lowest freezing point.

|  | # 13 | # 13 A | # 13 B | # 13 D |
|---|---|---|---|---|
| freezing point ° C. | −10.9 | −12.5 | −16.0 | −9.1 |

EXAMPLE 9

Based on the freezing point results from study 8, formulation #13B was selected for further studies. This study shows two different formulations used in the next four studies. The dye was removed from the formula and replaced with water. Mixture A is a commercially available product with similar characteristics as the present invention (Formula #13B).

|  | Percent of Components | |
|---|---|---|
| Component | Mixture A | Formula #13B |
| Acetic acid (56%) | 79.6 | 30.0 |
| Ethoxylated castor oil PEG-60 | 2.26 | 22.5 |
| Butyric acid | 14.9 | 0.0 |
| d-Limonene | 0.24 | 0.0 |
| Propylene Glycol | 0.0 | 15.0 |
| Water | 3.0 | 32.5 |

EXAMPLES 10 THROUGH 13

These experiments show the effect of commercially available Mixture A and inventive Formula #13B on milling efficiency and pellet quality. Mixture A and Formula #13B were diluted in water to 5% conc. and 0.5% conc., respectively. Dilutions were applied to different feed formulations in the mixer via hydraulic nozzles. The feed was pelleted and production parameters were measured.

Example 10. Comparison of Solutions on Milling Efficiency and Pellet Quality in Swine Feed

| Parameter | Mixture A | Formula #13B | Difference | Percent Difference |
|---|---|---|---|---|
| Pellet Motor Amps | 288.00 | 286.50 | −1.50 | −0.52 |
| Feed Moisture (%) at mixer | 13.85 | 13.41 | −0.44 | −3.18 |
| Pellet Moisture (%) prior to fat coating | 12.88 | 12.90 | 0.03 | 0.19 |
| Tonne/hr | 9.19 | 9.62 | 0.43 | 4.72 |
| Kw-h/tonne | 17.95 | 17.05 | −0.90 | −5.00 |
| Cost (£) Kw-H/ton | 1.90 | 1.81 | −0.10 | −5.00 |
| Delta T Reduction | 19.70 | 19.30 | −0.40 | −2.03 |

Example 11. Comparison of Solutions on Milling Efficiency and Pellet Quality in Duck Finisher Feed

| Parameter | Mixture A | Formula #13B | Difference | Percent Difference |
|---|---|---|---|---|
| Pellet Motor Amps | 281.33 | 283.33 | 2.00 | 0.71 |
| Feed Moisture (%) at mixer | 14.31 | 14.44 | 0.13 | 0.89 |
| Pellet Moisture (%) prior to fat coating | 13.38 | 13.40 | 0.02 | 0.11 |
| Tonne/hr | 9.96 | 9.80 | −0.16 | −1.57 |
| Kw-h/tonne | 16.17 | 16.55 | 0.37 | 2.31 |
| Cost (£) Kw-H/ton | 1.71 | 1.75 | 0.04 | 2.31 |
| Delta T Reduction | 19.00 | 17.70 | −1.30 | −6.84 |

Example 12. Comparison of Solutions on Milling Efficiency and Pellet Quality in Broiler Starter Feed

| Parameter | Mixture A | Formula #13B | Difference | Percent Difference |
|---|---|---|---|---|
| Pellet Motor Amps | 222.50 | 213.00 | −9.50 | −4.27 |
| Feed Moisture (%) at mixer | 12.50 | 12.56 | 0.06 | 0.48 |
| Pellet Moisture (%) prior to fat coating | 12.17 | 11.74 | −0.43 | −3.53 |

Example 13. Comparison of Solutions on Milling Efficiency and Pellet Quality in Swine Finisher Feed

| Parameter | Mixture A | Formula #13B | Difference | Percent Difference |
|---|---|---|---|---|
| Pellet Motor Amps | 285.00 | 290.67 | 5.67 | 1.99 |
| Feed Moisture (%) at mixer | 13.24 | 13.42 | 0.17 | 1.32 |
| Pellet Moisture (%) prior to fat coating | 12.55 | 12.51 | −0.04 | −0.30 |
| Tonne/hr | 8.47 | 8.68 | 0.21 | 2.52 |
| Kw-h/tonne | 19.27 | 19.17 | −0.10 | −0.52 |
| Cost (£) Kw-H/ton | 2.04 | 2.03 | −0.01 | −0.52 |
| Delta T Reduction | 18.90 | 21.53 | 2.63 | 13.93 |

Formula #13B compared favourably with the commercially available Mixture A with respect to the amount of energy required for pelleting. Moisture retention in the pellets was similar and percent of free moisture (available water; Aw) was lower. From these four studies, it can be concluded that Formula #13B has similar or better properties than the commercially available Mixture A even though the surfactant concentration in stock Formula #13B is much higher and has a different composition.

EXAMPLES 14-17

In this study Formula #13B was prepared using two different surfactants: polysorbate 80 (P-80) or ethoxylated castor oil CO-60. Formula #13B was diluted and applied as in studies 10-13. These products were compared to control diets were with water added as to milling efficiency and pellet quality. Four different diets with different compositions were used in this study.

Example 14. Impact of Solutions on Milling Efficiency and Pellet Quality of Broiler Starter Feed

| Parameter | Control | Formula #13B (P-80) | Formula #13B (CO-60) |
|---|---|---|---|
| Pellet Moisture (%) | 12.1 | 11.95 | 11.9 |
| FMA | 0.55 | 0.575 | 0.575 |
| Fines (%) | 0.125 | 0.1 | 0.1 |
| Pellet durability index (PDI) | 83 | 91 | 90 |
| AMPS | 296.5 | 247.5 | 246 |
| Tons/hr | 33.5 | 33.5 | 33.5 |
| Conditioner Gauge Temp (° F.) | 172.5 | 184 | 187.5 |
| Actual Temp (° F.) | 175 | 186 | 185.5 |
| Difference | 2.5 | 2 | −2 |
| % Difference | 1.45 | 1.09 | −1.07 |
| Die Temp | 184 | 193 | 193 |
| Delta "T" | 9 | 7 | 7.5 |

Example 15. Impact of Solutions on Milling Efficiency and Pellet Quality of Broiler Grower Feed

| Parameter | Control | Formula #13B (P-80) | Formula #13B (CO-60) |
|---|---|---|---|
| Pellet Moisture (%) | 10.7 | 11.2 | 11.45 |
| FMA | 0.525 | 0.55 | 0.555 |
| Fines (%) | 0.17 | 0.11 | 0.1 |
| Pellet durability index (PDI) | 84 | 88 | 88 |
| AMPS | 292.5 | 267.5 | 252.5 |
| Tons/hr | 33.5 | 33.5 | 33.5 |
| Conditioner Gauge Temp (° F.) | 187.5 | 186 | 191 |
| Actual Temp (° F.) | 185 | 184 | 187.5 |
| Difference | −2.5 | −2 | −3.5 |
| % Difference | −1.33 | −1.06 | −1.81 |
| Die Temp | 192.5 | 193.5 | 195.5 |
| Delta "T" | 7.5 | 9.5 | 8 |

Example 16. Impact of Solutions on Milling Efficiency and Pellet Quality of Broiler Withdrawal #1 Feed

| Parameter | Control | Formula #13B (P-80) | Formula #13B (CO-60) |
|---|---|---|---|
| Pellet Moisture (%) | 10.4 | 11.3 | 11.3 |
| FMA | 0.525 | 0.55 | 0.565 |
| Fines (%) | 0.19 | 0.07 | 0.09 |
| Pellet durability index (PDI) | 85 | 86 | 86 |
| AMPS | 290 | 290 | 267.5 |

Example 16. Impact of Solutions on Milling Efficiency and Pellet Quality of Broiler Withdrawal #1 Feed

| Parameter | Control | Formula #13B (P-80) | Formula #13B (CO-60) |
|---|---|---|---|
| Tons/hr | 33.5 | 33.5 | 33.5 |
| Conditioner Gauge Temp (° F.) | 190 | 192 | 185 |
| Actual Temp (° F.) | 182 | 182.5 | 183 |
| Difference | −8 | −9.5 | −2 |
| % Difference | −4.21 | −4.95 | −1.08 |
| Die Temp | 192 | 189 | 193.5 |
| Delta "T" | 10 | 6.5 | 10.5 |

Example 17. Impact of Solutions on Milling Efficiency and Pellet Quality of Broiler Withdrawal #2 Feed

| Parameter | Control | Formula #13B (CO-60) |
|---|---|---|
| Pellet Moisture (%) | 10.9 | 11.25 |
| FMA | 0.5 | 0.55 |
| Fines (%) | 0.16 | 0.088 |
| Pellet durability index (PDI) | 84 | 86 |
| AMPS | 310 | 300 |
| Tons/hr | 33.5 | 33.5 |
| Conditioner Gauge Temp (° F.) | 180 | 175 |
| Actual Temp (° F.) | 181 | 170 |
| Difference | 1 | −5 |
| % Difference | 0.6 | −2.87 |
| Die Temp | 193 | 185 |
| Delta "T" | 12 | 15 |

The use of these solutions, Formula #13B (CO-60) or Formula #13B (Tmaz) during pelletization resulted in similar improvements on milling efficiency and pellet quality than the control diet treated with just water.

EXAMPLES 18-25

These studies show the effect of Formula #13B compared to untreated feed on milling efficiency and pellet quality. Formula #13B was diluted in water to a 0.5% conc. and applied to different feed formulations in the mixer via hydraulic nozzles. The feed was pelleted and production parameters measured.

Example 18. Impact of Solutions on Milling Efficiency and Pellet Quality of Broiler Withdrawal #1 Feed

| | Control | Solution I (1% added) | Difference | Percent Difference |
|---|---|---|---|---|
| Amperage | 200 | 165 | −35 | −17.5 |
| Conditioner Moisture (%) | 15.01 | 16.65 | 1.64 | 10.93 |
| Cooler Moisture (%) | 12.69 | 12.77 | 0.08 | 0.63 |
| Conditioner Temperature Gauge (° F.) | 170 | 185 | 15.0 | 8.82 |
| Conditioner Temperature Actual (° F.) | 164 | 178 | 14.0 | 8.54 |
| Fines (%) | 46.6 | 13.00 | −33.60 | −72.10 |
| PDI (Exiting Cooler) | 36.50 | 61.50 | 25.00 | 68.49 |
| Tons/hr | 31.03 | 31.00 | −0.03 | −0.10 |
| Amps/Tons | 6.45 | 5.32 | −1.12 | −17.42 |

Example 19. Impact of Solutions on Milling Efficiency and Pellet Quality of Broiler Finisher Feed

| | Control | Formula #13B (1% added) | Difference | Percent Difference |
|---|---|---|---|---|
| Amperage | 225 | 185 | −40 | −17.78 |
| Conditioner Moisture (%) | 15.23 | 16.23 | 1.00 | 6.57 |
| Cooler Moisture (%) | 11.91 | 12.78 | 0.87 | 7.3 |
| Conditioner Temperature Gauge (° F.) | 160 | 162 | 2.0 | 1.25 |
| Conditioner Temperature Actual (° F.) | 170 | 180 | 10.0 | 5.88 |
| Fines (%) | 42.50 | 20.94 | −21.56 | −50.73 |
| PDI (Exiting Cooler) | 43.40 | 66.10 | 22.70 | 52.30 |
| Tons/HR | 33.20 | 33.57 | 0.37 | 1.11 |
| Amps/Tons | 6.7 | 5.51 | −1.19 | −17.76 |

Example 20. Impact of Solutions on Milling Efficiency and Pellet Quality of Broiler Finisher Feed Containing Cookie Meal

| | Control | Formula #13B (1% added) | Difference | Percent Difference |
|---|---|---|---|---|
| Amperage | 225 | 235 | 10 | 4.44 |
| Conditioner Moisture (%) | 15.23 | 16.23 | 1.00 | 6.57 |
| Cooler Moisture (%) | 12.78 | 12.29 | −0.49 | −3.83 |
| Conditioner Temperature Gauge (° F.) | 160 | 164 | 4.0 | 2.50 |
| Conditioner Temperature Actual (° F.) | 162 | 178 | 16.0 | 9.88 |
| Fines (%) | 42.5 | 28.7 | −13.80 | −32.47 |
| PDI (Exiting Cooler) | 43.4 | 57.3 | 13.90 | 68.49 |
| Tons/HR | 33.2 | 37.7 | 4.5 | 13.55 |
| Amps/Tons | 6.77 | 6.23 | −0.54 | −7.98 |

Example 21. Impact of Solutions on Milling Efficiency and Pellet Quality of Broiler Withdrawl #1 Feed

| | Control | Formula #13B (2% added) | Difference | Percent Difference |
|---|---|---|---|---|
| Amperage | 200 | 170 | −30.00 | 15 |
| Conditioner Moisture (%) | 12.70 | 16.85 | 4.15 | 32.68 |
| Cooler Moisture (%) | 11.79 | 12.34 | 0.55 | 4.66 |
| Conditioner Temperature Gauge (° F.) | 170 | 182 | 12.0 | 7.06 |
| Conditioner Temperature Actual (° F.) | 164 | 173 | 9.0 | 5.49 |
| Fines (%) | 38.10 | 18.90 | −19.20 | −50.39 |
| PDI (Exiting Cooler) | 36.10 | 66.60 | 30.50 | 84.49 |
| Tons/HR | 30.00 | 33.96 | 3.96 | 13.20 |
| Amps/Tons | 6.66 | 5.00 | −1.66 | −24.92 |

Example 22. Impact of Solutions on Milling Efficiency and Pellet Quality of Broiler Finisher Feed

| | Control | Formula #13B (2% added) | Difference | Percent Difference |
|---|---|---|---|---|
| Amperage | 235 | 210 | −25.00 | −10.64 |
| Conditioner Moisture (%) | 15.29 | 16.14 | 0.85 | 5.56 |
| Cooler Moisture (%) | 12.72 | 13.37 | 0.65 | 5.11 |

Example 22. Impact of Solutions on Milling Efficiency and Pellet Quality of Broiler Finisher Feed

|  | Control | Formula #13B (2% added) | Difference | Percent Difference |
|---|---|---|---|---|
| Conditioner Temperature Gauge (° F.) | 161 | 165 | 4 | 2.28 |
| Conditioner Temperature Actual (° F.) | 161 | 175 | 14 | 8.70 |
| Fines (%) | 34.90 | 16.10 | −18.80 | −53.87 |
| PDI (Exiting Cooler) | 41.50 | 60.10 | 18.60 | 44.82 |
| Tons/HR | 27.70 | 33.33 | 5.63 | 20.32 |
| Amps/Tons | 8.48 | 6.30 | −2.18 | −25.71 |

Example 23. Impact of Solutions on Milling Efficiency and Pellet Quality of Broiler Finisher Feed (Run 2)

|  | Control | Formula #13B (2% added) | Difference | Percent Difference |
|---|---|---|---|---|
| Amperage | 235 | 225 | −10.00 | −4.26 |
| Conditioner Moisture (%) | 15.29 | 16.99 | 1.70 | 11.12 |
| Cooler Moisture (%) | 12.72 | 13.42 | 0.70 | 5.50 |
| Conditioner Temperature Gauge (° F.) | 161 | 165 | 4.00 | 2.48 |
| Conditioner Temperature Actual (° F.) | 161 | 173 | 12.00 | 7.45 |
| Fines (%) | 34.90 | 14.30 | −20.60 | −59.03 |
| PDI (Exiting Cooler) | 41.50 | 68.40 | 26.90 | 64.82 |
| Tons/HR | 27.70 | 40.90 | 13.20 | 47.65 |
| Amps/Tons | 8.48 | 5.50 | −2.98 | −35.14 |

Example 24. Impact of Solutions on Milling Efficiency and Pellet Quality of Broiler Withdrawal #1 Feed with Cookie Meal

|  | Control | Formula #13B (2% added) | Difference | Percent Difference |
|---|---|---|---|---|
| Amperage | 240 | 200 | −40.00 | 16.67 |
| Conditioner Moisture (%) | 15.14 | 16.83 | 1.69 | 11.26 |
| Cooler Moisture (%) | 12.04 | 13.33 | 1.29 | 10.71 |
| Conditioner Temperature Gauge (° F.) | 166 | 175 | 9.0 | 5.42 |
| Conditioner Temperature Actual (° F.) | 161 | 169 | 8.0 | 4.97 |
| Fines (%) | 18.50 | 16.80 | −1.70 | −9.19 |
| PDI (Exiting Cooler) | 51.70 | 68.30 | 16.60 | 32.11 |
| Tons/HR | 31.05 | 31.10 | 0.05 | 0.16 |
| Amps/Tons | 7.72 | 6.43 | −1.29 | −16.71 |

Example 25. Impact of Solutions on Milling Efficiency and Pellet Quality of Broiler Finisher Feed with Cookie Meal

|  | Control | Formula #13B (2% added) | Difference | Percent Difference |
|---|---|---|---|---|
| Amperage | 240 | 250 | 10 | 4.17 |
| Conditioner Moisture (%) | 15.49 | 16.67 | 1.18 | 7.62 |
| Cooler Moisture (%) | 11.81% | 13.36 | 1.55 | 13.12 |
| Conditioner Temperature Gauge (° F.) | 166 | 168 | 2.0 | 1.20 |
| Conditioner Temperature Actual (° F.) | 161 | 177 | 16.0 | 9.94 |
| Fines (%) | ND | 18.50 | — | — |
| PDI (Exiting Cooler) | 53.70 | 74.90 | 21.20 | 39.48 |
| Tons/HR | 34.29 | 33.90 | −0.39 | −1.14 |
| Amps/Tons | 6.99 | 7.37 | 0.38 | 5.44 |

These results demonstrate that the addition of Formula #13B (0.5% concentration) to feed at a 1 or 2% addition rate improves milling efficiency and pellet quality in various feeds as compared to feed with just water added.

What is claimed is:

1. A process for making pelleted animal feed or pet food, said process comprising:
   i) diluting a stock solution with 10 to 200 parts water to make a heat-treating composition, said stock solution containing:
      a) 10-30 wt. % of acetic acid, propionic acid;
      b) 15-30 wt. % of a polysorbate-80 surfactant, an ethoxylated castor oil surfactant having an HLB from 4 to 18 and a molar ratio of 1 molecule of castor oil to 40-60 molecules of ethylene oxide, or a mixture thereof;
      c) 5-20 wt. % of propylene glycol; and
      d) 0-50 wt. % of water;
   ii) applying about 0.5 to 2.0 1 to 10 wt. % of the heat-treating composition to an animal feed or pet food, wherein the applied heat-treating composition does not impart anti-fungal activity to the animal feed or pet food; and
   iii) either pelletizing the mixture of the animal feed or pet food and the heat-treating composition with sufficient heat to make pelleted animal feed or pet food, or extruding and then pelletizing the treated animal feed or pet food with sufficient heat to make pelleted animal feed or pet food.

2. The process of claim 1, wherein the heat-treating composition is applied to the animal feed in water.

3. The process of claim 1, wherein the heat-treating composition is applied in an amount of 1 to 5 wt. % based on the weight of the animal feed.

4. The process of claim 1, wherein the acetic acid of the stock solution is unbuffered.

5. The process of claim 1, wherein the stock solution contains the mixture of the polysorbate-80 surfactant and the ethoxylated castor oil surfactant.

6. The process of claim 1, wherein the stock solution comprises 10 to 30 wt. % acetic acid, 22.5 wt. % polysorbate-80, and 15 wt. % propylene glycol.

7. The process of claim 1, wherein the stock solution comprises 16.8 wt. % acetic acid, 22.5 wt. % polysorbate-80, and 15 wt. % propylene glycol.

8. The process of claim 1, wherein the stock solution comprises 10 to 30 wt. % acetic acid, 22.5 wt. % of the ethoxylated castor oil surfactant having a molar ratio of 1 molecule of castor oil to 60 molecules of ethylene oxide, and 15 wt. % propylene glycol.

9. The process of claim 1, wherein the stock solution comprises 16.8 wt. % acetic acid, 22.5 wt. % of the ethoxylated castor oil surfactant having a molar ratio of 1 molecule of castor oil to 60 molecules of ethylene oxide, and 15 wt. % propylene glycol.

\* \* \* \* \*

UNITED STATES PATENT AND TRADEMARK OFFICE
CERTIFICATE OF CORRECTION

PATENT NO. : 10,980,251 B2
APPLICATION NO. : 14/126699
DATED : April 20, 2021
INVENTOR(S) : Julio Pimentel, Kurt Richardson and Don Wilson Page 1 of 1

It is certified that error appears in the above-identified patent and that said Letters Patent is hereby corrected as shown below:

In the Claims

In Claim 1 at Line 6, delete ", propionic acid".

In Claim 1 at Line 14, delete "0.5 to 2.0".

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*